United States Patent
Brown et al.

(10) Patent No.: US 9,237,148 B2
(45) Date of Patent: Jan. 12, 2016

(54) SYSTEM AND METHOD FOR DISPLAYING A SECURITY ENCODING INDICATOR ASSOCIATED WITH A MESSAGE ATTACHMENT

(75) Inventors: Michael K. Brown, Kitchener (CA);
Michael G. Kirkup, Waterloo (CA);
Michael S. Brown, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 1889 days.

(21) Appl. No.: 11/841,166

(22) Filed: Aug. 20, 2007

(65) Prior Publication Data
US 2009/0055643 A1    Feb. 26, 2009

(51) Int. Cl.
| | |
|---|---|
| G06F 9/00 | (2006.01) |
| G06F 9/24 | (2006.01) |
| G06F 15/177 | (2006.01) |
| H04L 29/06 | (2006.01) |
| H04L 9/32 | (2006.01) |

(52) U.S. Cl.
CPC .......... *H04L 63/0823* (2013.01); *H04L 9/3247* (2013.01); *H04L 9/3263* (2013.01); *H04L 63/123* (2013.01); *H04L 2209/80* (2013.01)

(58) Field of Classification Search
CPC .................................................. H04L 63/0823
USPC ............ 709/204–207; 715/751–759; 713/152
See application file for complete search history.

(56) References Cited

U.S. PATENT DOCUMENTS

| | | |
|---|---|---|
| 4,486,856 A | 12/1984 | Heckel et al. |
| 5,497,422 A | 3/1996 | Tysen et al. |
| 5,956,034 A | 9/1999 | Sachs et al. |
| 6,061,731 A | 5/2000 | Blakeslee |
| 6,301,484 B1 | 10/2001 | Rogers et al. |
| 6,324,500 B1 | 11/2001 | Amro et al. |
| 6,356,937 B1 | 3/2002 | Montville et al. |
| 6,393,297 B1 | 5/2002 | Song |
| 6,590,588 B2 | 7/2003 | Lincke et al. |
| 6,591,095 B1 | 7/2003 | Palaniswamy et al. |
| 6,598,161 B1 | 7/2003 | Kluttz et al. |
| 6,600,814 B1 | 7/2003 | Carter et al. |

(Continued)

FOREIGN PATENT DOCUMENTS

| | | |
|---|---|---|
| CA | 2639092 | 10/2014 |
| EP | 1195971 | 4/2002 |

(Continued)

OTHER PUBLICATIONS

European Search and Examination Report. Application No. 07114623.7. Dated: Feb. 28, 2008.

(Continued)

*Primary Examiner* — Dant Shaifer Harriman
(74) *Attorney, Agent, or Firm* — Integral Intellectual Property Inc.; Miriam Paton; Amy Scouten

(57) ABSTRACT

An apparatus and method of displaying a message on a display of a computing device. The message comprises at least a first attachment. At least a portion of the message is displayed to a user. The displayed portion comprises an identifier for the first attachment. In one embodiment, a security encoding indicator is associated with the identifier for the first attachment and displayed to the user. If a security encoding has been applied to the first attachment, the security encoding indicator indicates the security encoding applied to the first attachment.

28 Claims, 10 Drawing Sheets

(56) References Cited

U.S. PATENT DOCUMENTS

| | | | |
|---|---|---|---|
| 6,636,965 B1 | 10/2003 | Beyda et al. | |
| 6,700,591 B1 | 3/2004 | Sharpe | |
| 6,732,101 B1 | 5/2004 | Cook | |
| 6,760,752 B1 | 7/2004 | Liu et al. | |
| 6,901,251 B1* | 5/2005 | Kiessling et al. | 455/410 |
| 6,931,532 B1 | 8/2005 | Davis et al. | |
| 6,963,971 B1 | 11/2005 | Bush et al. | |
| 6,993,574 B2 | 1/2006 | Hall | |
| 7,123,900 B2 | 10/2006 | Brown et al. | |
| 7,130,886 B2 | 10/2006 | Little et al. | |
| 7,131,003 B2* | 10/2006 | Lord et al. | 713/168 |
| 7,164,928 B2 | 1/2007 | Ding et al. | |
| 7,228,433 B2 | 6/2007 | Turner et al. | |
| 7,281,201 B2 | 10/2007 | Kumar et al. | |
| 7,299,359 B2 | 11/2007 | Hurley | |
| 7,346,769 B2 | 3/2008 | Forlenza et al. | |
| 7,415,607 B2 | 8/2008 | Sinn | |
| 7,483,950 B2 | 1/2009 | Little et al. | |
| 7,484,107 B2 | 1/2009 | Forlenza et al. | |
| 7,532,723 B2* | 5/2009 | Chitrapu et al. | 380/44 |
| 8,261,184 B2 | 9/2012 | Haase | |
| 8,521,130 B2 | 8/2013 | Brown et al. | |
| 8,832,445 B2 | 9/2014 | Brown et al. | |
| 8,874,080 B2 | 10/2014 | Brown et al. | |
| 2002/0142808 A1 | 10/2002 | Abbasi | |
| 2002/0166049 A1 | 11/2002 | Sinn | |
| 2002/0169954 A1 | 11/2002 | Bandini et al. | |
| 2003/0009595 A1 | 1/2003 | Collins | |
| 2003/0033480 A1 | 2/2003 | Jeremiassen | |
| 2003/0187938 A1 | 10/2003 | Mousseau et al. | |
| 2004/0136533 A1 | 7/2004 | Takagaki et al. | |
| 2004/0168055 A1 | 8/2004 | Lord et al. | |
| 2004/0180646 A1 | 9/2004 | Donley et al. | |
| 2004/0203589 A1 | 10/2004 | Wang et al. | |
| 2004/0203941 A1 | 10/2004 | Kaplan et al. | |
| 2004/0224675 A1 | 11/2004 | Puskoor et al. | |
| 2004/0246523 A1 | 12/2004 | Moriwaki | |
| 2005/0054334 A1 | 3/2005 | Brown et al. | |
| 2005/0071632 A1 | 3/2005 | Pauker et al. | |
| 2005/0111631 A1 | 5/2005 | Jordan, Jr. | |
| 2005/0188312 A1 | 8/2005 | Bocking et al. | |
| 2005/0246526 A1 | 11/2005 | Forlenza et al. | |
| 2005/0246540 A1 | 11/2005 | Brown | |
| 2005/0254654 A1* | 11/2005 | Rockwell et al. | 380/270 |
| 2006/0084450 A1 | 4/2006 | Dam Nielsen et al. | |
| 2006/0288274 A1* | 12/2006 | Bustelo et al. | 715/513 |
| 2006/0293035 A1 | 12/2006 | Brown | |
| 2007/0168436 A1* | 7/2007 | Andam | 709/206 |

FOREIGN PATENT DOCUMENTS

| | | |
|---|---|---|
| EP | 1265182 | 12/2002 |
| EP | 1580953 | 9/2005 |
| WO | 01/35685 | 5/2001 |
| WO | 02/01373 | 1/2002 |
| WO | 03/036887 | 5/2003 |
| WO | 03/075530 | 9/2003 |
| WO | 2005/015861 | 2/2005 |
| WO | 2005/107177 | 11/2005 |
| WO | 01/19049 | 3/2006 |

OTHER PUBLICATIONS

Netscapetut Bodytext, pp. 1-4, Aug. 19 2000, XP-002283474.
PGP Freeware for Windows 95, Windows 98, Windows NT, Windows 2000 & Windows Millennium, User's Guide, Version 7.0, pp. 1-246, Jan. 2001, XP-002286313.
E-Mail Security with PGP and PEM: How to Keep Your Electronic Mail Private, Bruce Schneier, Wiley Publishing 1995—26 pgs.
MIME Security with Pretty Good Privacy: RFC 2015, Michael Elkins, Oct. 1996—8 pgs.
Office Action. Co-pending U.S. Appl. No. 11/065,958. Dated: Oct. 7, 2008.
Response. Co-pending U.S. Appl. No. 11/065,958. Dated: Feb. 9, 2009.
Office Action. Co-pending U.S. Appl. No. 11/065,958. Dated: May 12, 2009.
Amendment. Co-pending U.S. Appl. No. 11/065,958. Dated: Aug. 18, 2009.
Final Office Action. Co-pending U.S. Appl. No. 11/065,958. Dated: Dec. 17, 2009.
Amendment After Final. Co-pending U.S. Appl. No. 11/065,958. Dated: Feb. 17, 2010.
Advisory Action. Co-pending U.S. Appl. No. 11/065,958. Dated: Mar. 17, 2010.
Amendment. Co-pending U.S. Appl. No. 11/065,958. Dated: Jun. 17, 2010.
Request for Continued Examination (RCE). Co-pending U.S. Appl. No. 11/065,958. Dated: Jun. 17, 2010.
Office Action. Co-pending U.S. Appl. No. 11/065,958. Dated: Aug. 5, 2010.
Amendment. Co-pending U.S. Appl. No. 11/065,958. Dated: Oct. 28, 2010.
Office Action. Co-pending U.S. Appl. No. 11/511,168. Dated: Aug. 20, 2009.
Amendment. Co-pending U.S. Appl. No. 11/511,168. Dated: Feb. 22, 2010.
Final Office Action. Co-pending U.S. Appl. No. 11/511,168. Dated: May 12, 2010.
Amendment After Final. Co-pending U.S. Appl. No. 11/511,168. Dated: Jul. 12, 2010.
Final Office Action. Co-pending U.S. Appl. No. 11/511,168. Dated: Jul. 21, 2010.
Amendment. Co-pending U.S. Appl. No. 11/511,168. Dated: Sep. 17, 2010.
Request for Continued Examination (RCE). Co-pending U.S. Appl. No. 11/511,168. Dated: Sep. 17, 2010.
United States Office Action, U.S. Appl. No. 11/065,958, dated Jan. 6, 2011.
United States Office Action Response, U.S. Appl. No. 11/065,958, dated May 4, 2011.
Ramsdell, B., "S/MIME Version 3.1 Message Specification", draft-ietf-smimerfc2633bis-08.txt, (2004), 26pgs.
United States Office Action, U.S. Appl. No. 11/065,958, dated Jul. 25, 2011.
Canadian Office Action, Canadian Patent Application No. 2,639,092, dated Aug. 31, 2011.
United States Office Action Response, U.S. Appl. No. 11/065,958, dated Oct. 25, 2011.
United States Office Action, U.S. Appl. No. 11/065,958, dated Jan. 12, 2012.
Advisory Action, U.S. Appl. No. 11/065,958, dated Apr. 18, 2012.
Office Action Response, U.S. Appl. No. 11/065,958, dated Apr. 3, 2012.
Office Action, U.S. Appl. No. 11/065,958, dated Mar. 16, 2012.
Office Action Response, U.S. Appl. No. 11/065,958, dated Mar. 6, 2012.
European Examination Report dated Jun. 26, 2012, European Patent Application 07114623.
European Examination Report dated Jun. 11, 2012, European Patent Application 07114623.
Response and RCE, U.S. Appl. No. 11/065,958, dated Jun. 18, 2012.
Response to European Examination Report dated Oct. 23, 2012, European Patent Application 07114623.
Document related to European Patent Application 07114623 dated Oct. 23, 2012 (Response).
Document related to Canadian Patent Application No. 2,639,092 dated Dec. 5, 2012 (Office Action).
Document related to Canadian Patent Application No. 2,639,092 dated Dec. 9, 2013 (Notice of Allowance).
Document related to European Patent Application 07114623 dated Jun. 4, 2014 (EP Summons).
Document related to European Patent Application 07114623 dated Sep. 17, 2014 (Withdrawal of Application).
Document related to European Patent Application 07114623 dated Sep. 23, 2014 (EP Acknowledgment of Withdrawal).

(56) References Cited

OTHER PUBLICATIONS

Document related to U.S. Appl. No. 11/511,168 dated Jan. 4, 2013 (Office Action).
Document related to U.S. Appl. No. 11/511,168 dated Apr. 3, 2013 (Response to Office Action).
Document related to U.S. Appl. No. 11/511,168 dated Apr. 26, 2013 (Notice of Allowance).
Documents relating to U.S. Appl. No. 13/950,924 (Prosecution Documents).
Document related to U.S. Appl. No. 11/065,958 dated Jun. 18, 2012 (Response to Office Action and RCE).
Document related to U.S. Appl. No. 11/065,958 dated Jul. 30, 2013 (Office Action).
Document related to U.S. Appl. No. 11/065,958 dated Oct. 30, 2013 (Office Action Response).
Document related to U.S. Appl. No. 11/065,958 dated Feb. 3, 2014 (Office Action).
Document related to U.S. Appl. No. 11/065,958 dated Apr. 3, 2014 (Response to Office Action).
Document related to U.S. Appl. No. 11/065,958 dated May 7, 2014 (Notice of Allowance).

* cited by examiner

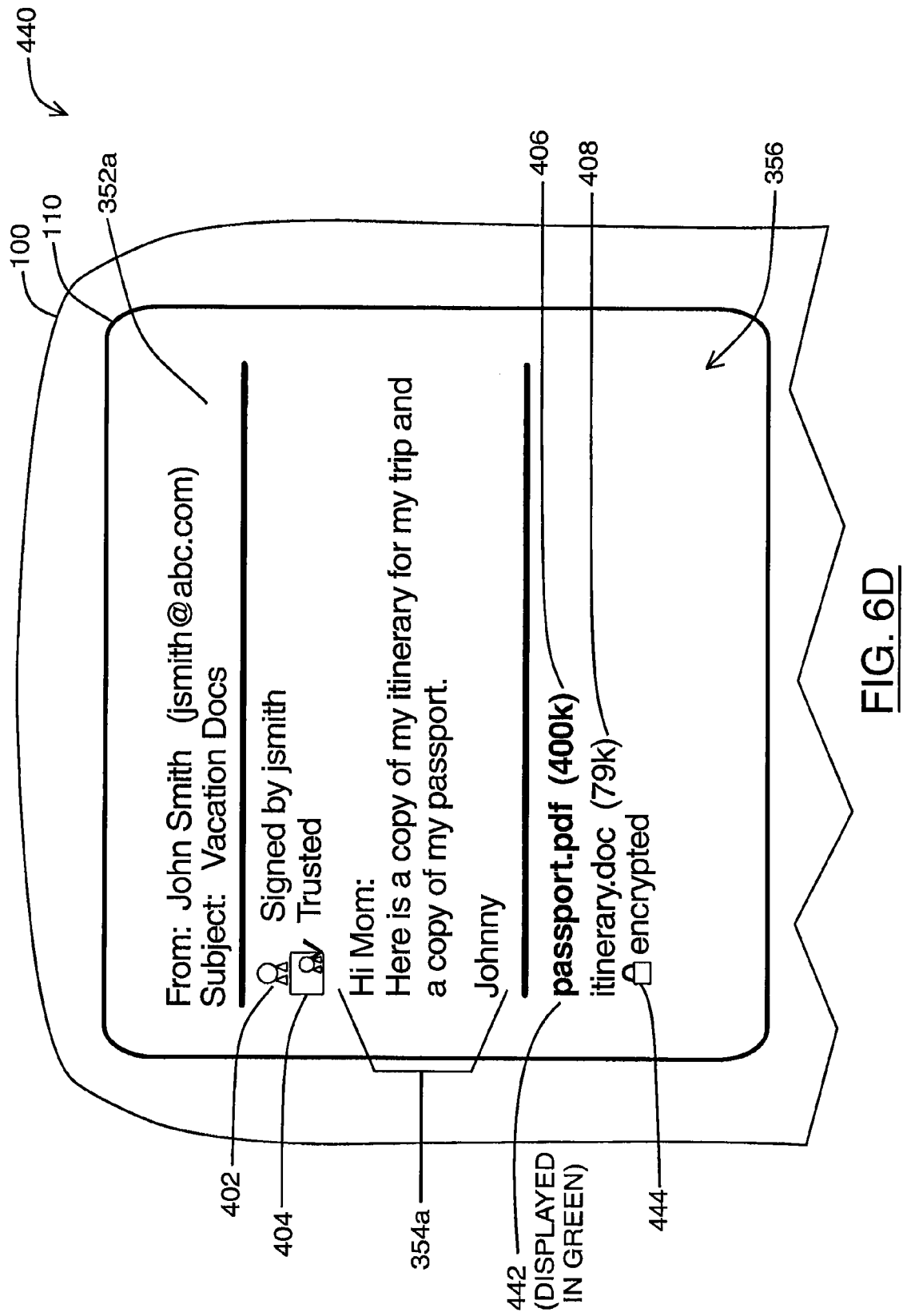

SYSTEM AND METHOD FOR DISPLAYING A SECURITY ENCODING INDICATOR ASSOCIATED WITH A MESSAGE ATTACHMENT

RELEVANT FIELD

Embodiments described herein relate generally to user interfaces and messaging applications for mobile devices, and more specifically to the processing of messages (e.g. electronic mail messages) comprising one or more encoded (e.g. encrypted and/or digitally signed) attachments.

BACKGROUND

The contents of electronic mail ("e-mail") messages may be generally encoded using one of a number of known protocols to facilitate secure message communication. The Secure Multiple Internet Mail Extensions ("S/MIME") protocol, for example, relies on public and private encryption keys to provide confidentiality and integrity, and on a Public Key Infrastructure (PKI) to communicate information that provides authentication and authorization. Data encoded using a private key of a private key/public key pair is decoded using the corresponding public key of the pair, and data encoded using a public key of a private key/public key pair is decoded using the corresponding private key of the pair. Other known standards and protocols may be employed to facilitate secure message communication, such as Pretty Good Privacy™ (PGP) and variants of PGP such as Open-PGP, for example. PGP-based systems also utilize public and private encryption keys to provide confidentiality and integrity, although the authenticity of public keys used in the encoding of PGP messages are validated in a different manner as compared to S/MIME systems. Constructs similar to that of a "certificate" (as used in S/MIME for example) containing a public key and information on the key holder may be provided in secure message communication standards and protocols. One example of such a construct is known as a "PGP key" in PGP-based systems.

The contents of a message may be encrypted, digitally signed ("signed") or both. Some protocols (e.g. some PGP variants) that are used to secure message data allow different security encodings to be applied to different parts of a message.

Consider a PGP message that contains signed message data in its message body, for example. Known messaging applications are typically adapted to generate an indicator, for display to a user through a user interface, that allows the user to quickly identify whether the message data in the body of the PGP message is signed and/or encrypted. However, the manner in which this indicator is typically displayed to users in known user interfaces of such messaging applications can be misleading. For example, when an indicator is associated with a message and identifies "the message" as being signed by an individual, the user typically assumes that all of the content of the message is signed by that individual even when, in fact, only message data in the message body is so signed.

BRIEF DESCRIPTION OF THE DRAWINGS

For a better understanding of embodiments of the systems and methods described herein, and to show more clearly how they may be carried into effect, reference will be made, by way of example, to the accompanying drawings in which:

FIGS. 6A to 6D are examples of messages comprising encoded message content as displayed in a user interface in accordance with at least one embodiment.

DETAILED DESCRIPTION

Figure 1:
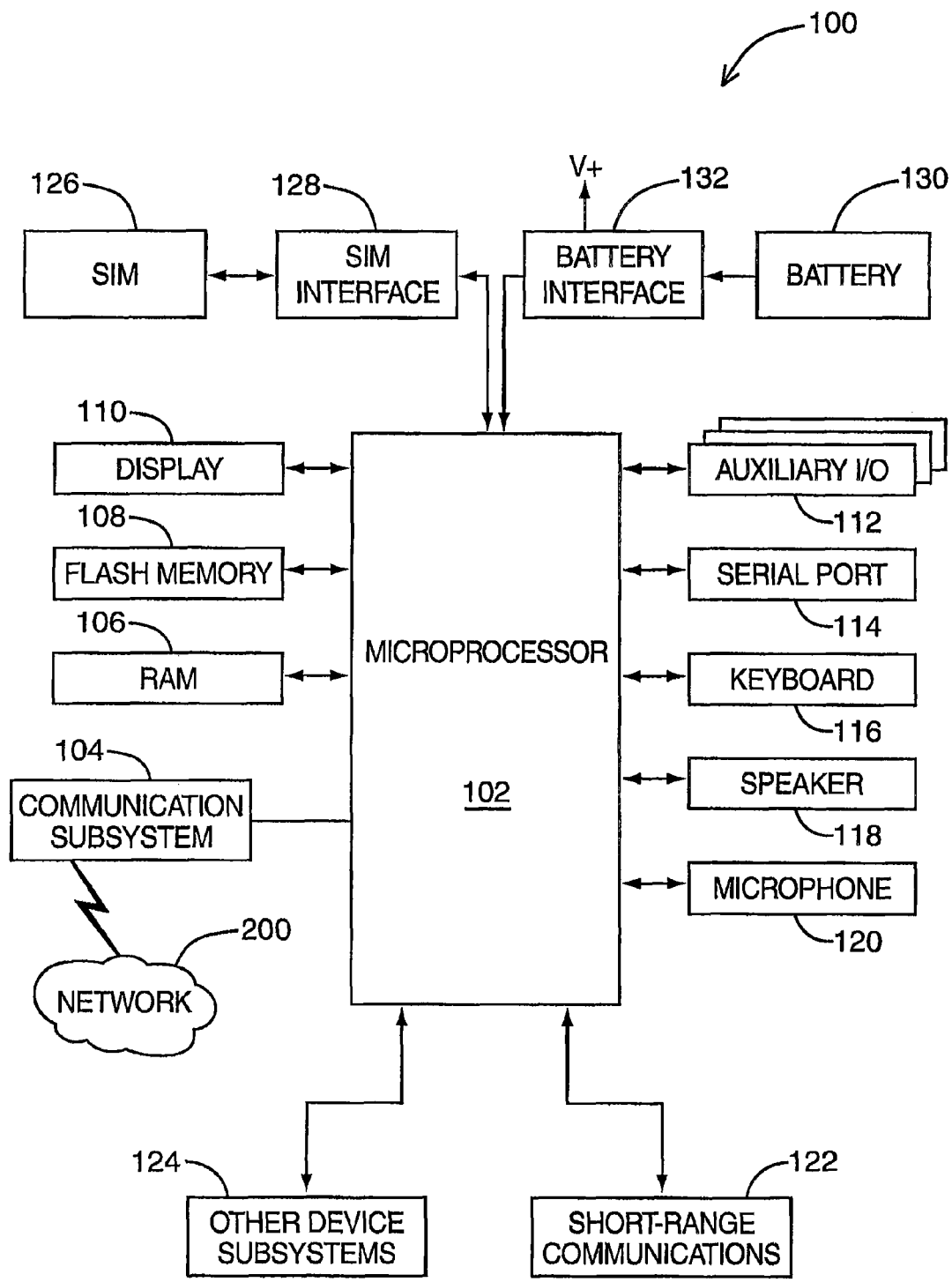
FIG. 1 is a block diagram of a mobile device in one example implementation.

Known messaging applications are typically adapted to generate an indicator, for display to a user through a user interface, that allows the user to quickly identify whether the message data in the body of a message is signed and/or encrypted. Unfortunately, the indicator is typically displayed in such a way that leads the user to believe that all of the content of the message is signed and/or encrypted even in cases where only message data in the message body is so signed and/or encrypted.

This situation can be particularly problematic when the message contains one or more attachments. Many known messaging applications are adapted to generate, for display to a user in a user interface, an indicator that a message is signed and/or encrypted, where the state of the indicator is based solely on whether content in the main body of the message is signed and/or encrypted, without any regard to whether the same security encoding has been applied to the attachment(s) of the message.

Embodiments described herein are generally directed to a system and method for generating a security encoding indicator on a display of a computing device such as a mobile device, to indicate whether a security encoding has been applied to particular message content, such as an attachment to a message received at the mobile device.

In one broad aspect, there is provided a method of displaying a message on a computing device, wherein the message comprises at least a first attachment, the method comprising: displaying at least a portion of the message, wherein the displayed portion comprises an identifier for the first attachment; and displaying at least one security encoding indicator, the at least one security encoding indicator being associated with the identifier for the first attachment; wherein if at least one security encoding has been applied to the first attachment, the at least one security encoding indicator indicates the at least one security encoding applied to the first attachment.

In another broad aspect, there is provided a mobile device comprising: a processor; a memory; and a display; wherein in operation, an application programmed to perform a method of displaying a message on a computing device, wherein the message comprises at least a first attachment, the method comprising: displaying at least a portion of the message, wherein the displayed portion comprises an identifier for the first attachment; and displaying at least one security encoding indicator, the at least one security encoding indicator being associated with the identifier for the first attachment; wherein if at least one security encoding has been applied to the first attachment, the at least one security encoding indicator indicates the at least one security encoding applied to the first attachment.

These and other aspects and features of various embodiments will be described in greater detail below.

Some embodiments of the systems and methods described herein make reference to a mobile device. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
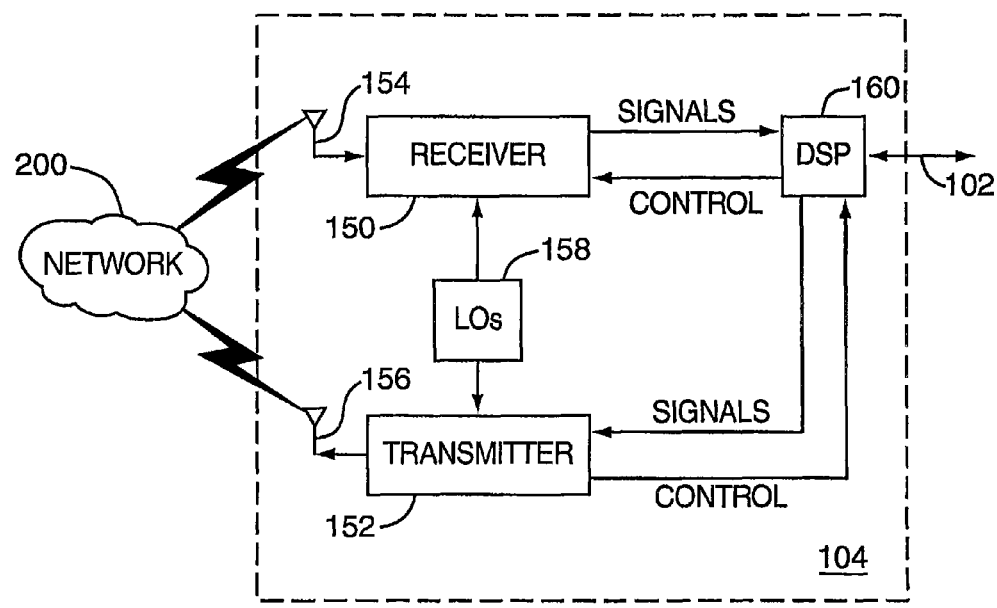
FIG. 2 is a block diagram of a communication subsystem component of the mobile device of FIG. 1.
Figure 3:
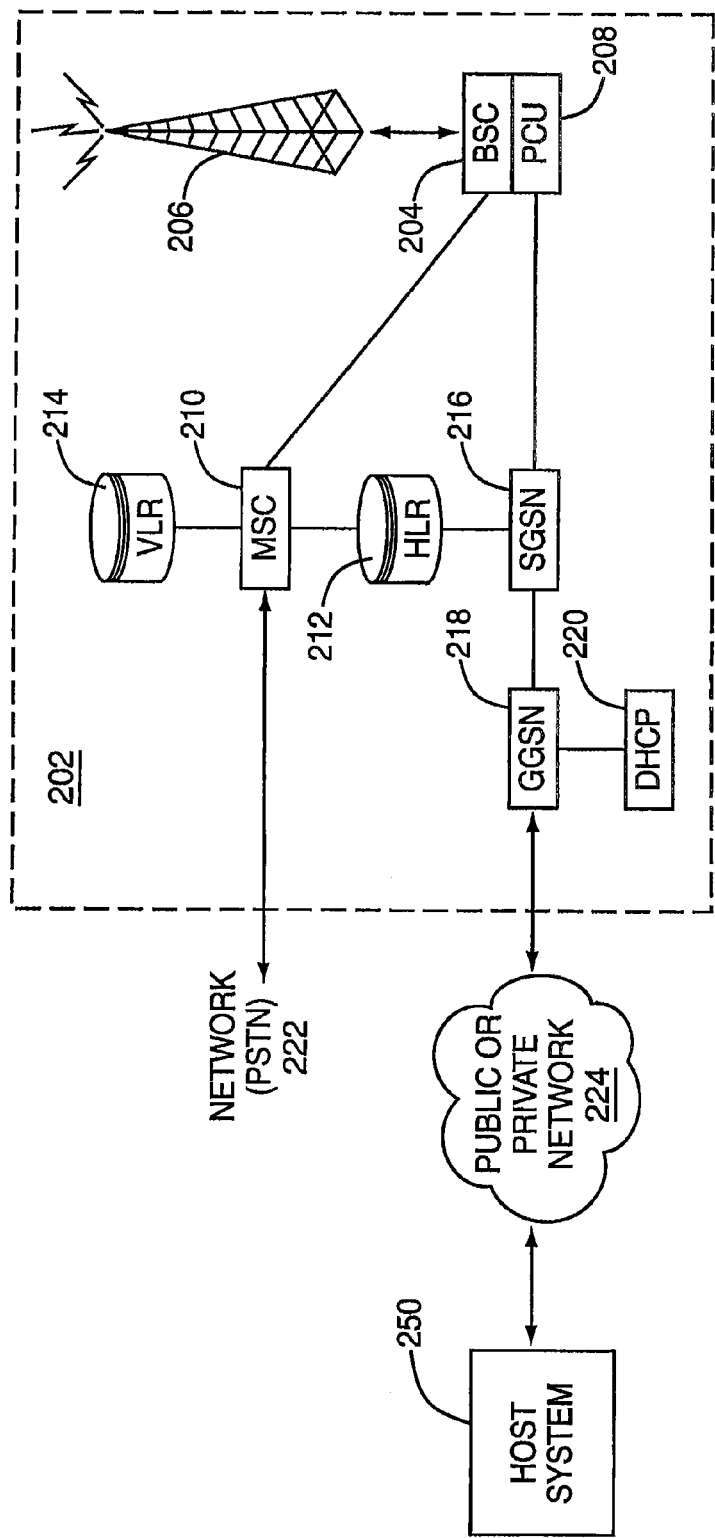
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE) and Universal Mobile Telecommunications Service (UMTS), and Ultra Mobile Broadband (UMB), etc. New standards are still being defined, but it is believed that they will have similarities to the network behaviour described herein, and it will also be understood by persons skilled in the art that the embodiments of the present disclosure are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems. Other network communication technologies that may be employed include, for example, Integrated Digital Enhanced Network (iDEN™), Evolution-Data Optimized (EV-DO), and High Speed Packet Access (HSPA), etc.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 may provide for a Subscriber Identity Module ("SIM") card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services may include without limitation: web browsing and messaging such as e-mail, voice mail, Short Message Service (SMS), and Multimedia Messaging Services (MMS). More advanced services may include without limitation: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 may be a battery-powered device and may include a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide the power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication include standards developed by the Infrared Data Association (IrDA), Bluetooth®, and the 802.11 family of standards (Wi-Fi®) developed by IEEE.

In use, a received signal such as a text message, an e-mail message, or web page download is processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad. A composed item may be transmitted over network 200 through communication subsystem 104.

For voice communications, the overall operation of mobile device 100 is substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with (GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 performs a "GPRS Attach" to acquire an IP address and to access data services. This normally is not present in circuit switched voice channels as Integrated Services Digital Network (ISDN) addresses are used for routing incoming and outgoing calls. Currently, GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
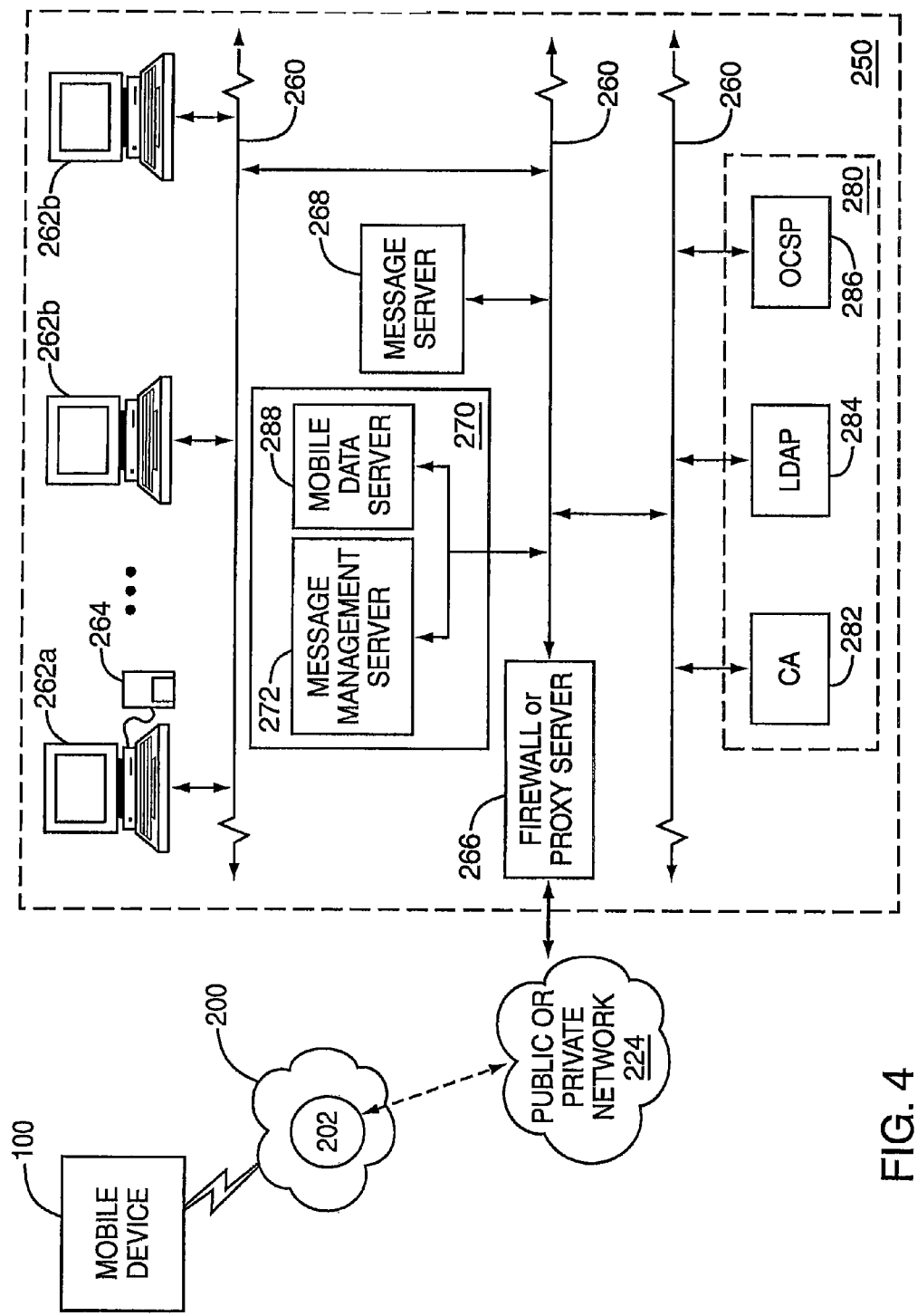
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include S/MIME certificates or PGP keys used in the exchange of messages.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection may include, for example, a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262*b* within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262*a* may request the e-mail messages associated with that user's account stored on message server 268. These messages may then typically be retrieved from message server 268 and stored locally on computer 262*a*.

When operating mobile device 100, the user may wish to have e-mail messages retrieved for delivery to the mobile device 100. An e-mail client application operating on mobile device 100 may request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262*a*, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices is supported.

While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and provides data integrity and privacy from the time an originator of a message sends a message until it is decoded and read by the message recipient. Other standards and protocols may be employed to facilitate secure message communication, such as Pretty Good Privacy™ (PGP) and variants of PGP such as OpenPGP, for example. It will be understood that where reference is generally made to "PGP" herein, the term is intended to encompass any of a number of variant implementations based on the more general PGP scheme.

Secure messaging protocols such as S/MIME and PGP-based protocols rely on public and private encryption keys to provide confidentiality and integrity. Data encoded using a private key of a private key/public key pair can only be decoded using the corresponding public key of the pair, and data encoded using a public key of a private key/public key pair can only be decoded using the corresponding private key of the pair. It is intended that private key information never be made public, whereas public key information is shared.

For example, if a sender wishes to send message data to a recipient in encrypted form, the recipient's public key is used to encrypt the message data, which can then be decrypted only using the recipient's private key. Alternatively, in some encoding techniques, a one-time session key is generated and used to encrypt the message data, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the encrypted message data. The message header may be used to specify the particular encryption scheme that must be used to decrypt the encrypted message data. Other encryption techniques based on public key cryptography may be used in variant implementations. However, in each of these cases, only the recipient's private key may be used to facilitate successful decryption of the encrypted message data, and in this way, the confidentiality of that data can be maintained.

As a further example, a sender may sign message data using a digital signature. A digital signature generally comprises a digest of the message data being signed (e.g. a hash of the message data being signed) encoded using the sender's private key, which can then be appended to the outgoing message. To verify the digital signature when received, the recipient uses the same technique as the sender (e.g. using the same standard hash algorithm) to obtain a digest of the received message data. The recipient also uses the sender's public key to decode the digital signature, in order to obtain what should be a matching digest for the received message data. If the digests of the received message do not match, this suggests that either the message data was changed during transport and/or the message data did not originate from the sender whose public key was used for verification. Digital signature algorithms are designed in such a way that only someone with knowledge of the sender's private key should be able to encode a digital signature that the recipient will decode correctly using the sender's public key. Therefore, by verifying a digital signature in this way, authentication of the sender and message integrity can be maintained.

In the description of exemplary embodiments herein, the term "secure encoding" is used. When reference is made to the application of a secure encoding to message data, this means that the message data is encoded using an encoding technique. As noted above, the act of encoding message data may include either encrypting the message data or signing the message data. It will be understood that encoded message data may also be both encrypted and signed. As used in this disclosure, "signed and/or encrypted" means signed or encrypted or both.

In S/MIME, the authenticity of public keys used in these operations is validated using certificates. A certificate is a digital document issued, for example, by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509). The certificates are typically digitally signed by the certificate authority.

In PGP-based systems, a PGP key is used, which is like an S/MIME certificate in that it contains public information including a public key and information on the key holder or owner. Unlike S/MIME certificates, however, PGP keys are not generally issued by a certificate authority, and the level of trust in the authenticity of a PGP key typically requires verifying that a trusted individual has vouched for the authenticity of a given PGP key.

While the term "PGP key" may not be commonly used interchangeably with the term "certificate", in the context of the embodiments described herein and for the purposes of the specification and in the claims, a "certificate" is deemed to include similar constructs of other secure messaging protocols such as a PGP key.

Standard e-mail security protocols typically facilitate secure message transmission between non-mobile computing devices (e.g. computers 262a, 262b of FIG. 4; remote desktop devices). In order that signed messages received from senders may be read from mobile device 100 and that encrypted messages be sent from mobile device 100, mobile device 100 is adapted to store public keys (e.g. in S/MIME certificates, PGP keys) of other individuals. Keys stored on a user's computer 262a may be downloaded from computer 262a to mobile device 100 through cradle 264, for example.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key may be exchanged between the computer 262a and mobile device 100 so that the user may share one identity and one method for accessing messages.

User computers 262a, 262b can obtain S/MIME certificates and PGP keys from a number of sources, for storage on computers 262a, 262b and/or mobile devices (e.g. mobile device 100) in a key store, for example. The sources of these certificates and keys may be private (e.g. dedicated for use within an organization) or public, may reside locally or remotely, and may be accessible from within an organization's private network or through the Internet, for example. In the example shown in FIG. 4, multiple public key infrastructure (PKI) servers 280 associated with the organization reside on LAN 250. PKI servers 280 include a CA server 282 that may be used for issuing S/MIME certificates, a Lightweight Directory Access Protocol (LDAP) server 284 that may be used to search for and download S/MIME certificates and/or PGP keys (e.g. for individuals within the organization), and an Online Certificate Status Protocol (OCSP) server 286 that may be used to verify the revocation status of S/MIME certificates, for example.

Certificates and/or PGP keys may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates and PGP keys through a mobile data server 288. Similarly, mobile data server 288 may be adapted to allow mobile device 100 to directly query OCSP server 286 to verify the revocation status of S/MIME certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of S/MIME certificates and PGP keys [not shown] may include a Windows certificate or key store, another secure certificate or key store on or outside LAN 250, and smart cards, for example.

Figure 5:
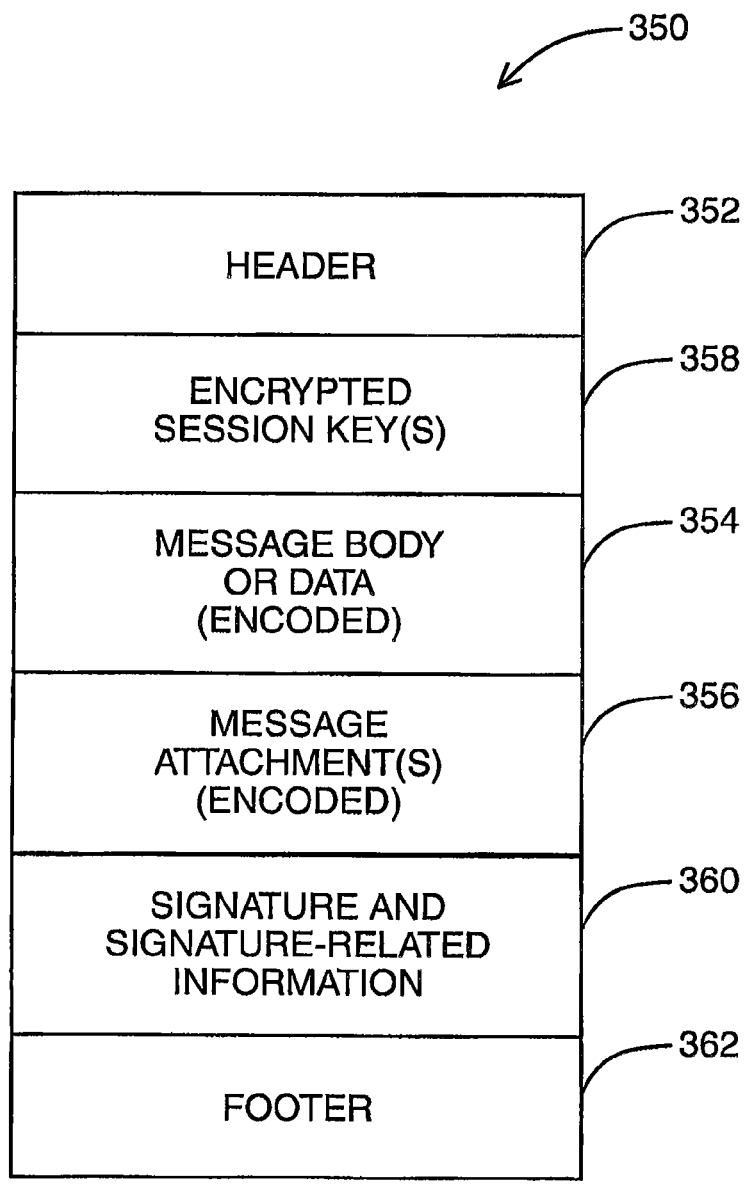
FIG. 5 is a block diagram illustrating components of an example of an encoded message.

Referring now to FIG. 5, a block diagram illustrating components of one example of an encoded message, as may be received by a message server (e.g. message server 268 of FIG. 4) and forwarded to a user (e.g. of mobile device 100), is shown generally as 350. Encoded message 350 typically includes one or more of the following: a header portion 352, one or more encrypted session keys 358 (if the message is encrypted), a body or data section 354, optionally one or more attachments 356 that may be encoded, digital signature and signature-related information 360; and a footer portion 362.

For example, header portion 352 for message 350 typically includes addressing information such as "To", "From", and "Cc" message addresses, and may also include message length indicators, and encryption and signature scheme identifiers, for example. Actual message content ("message data") is normally included in body or data section 354 and possibly in one or more attachments 356, which may be encrypted by the sender using a session key. If a session key is to be used, it is typically encrypted for each intended recipient using the respective public key for each recipient, and included in the message at 358.

If the message is signed, a digital signature and signature-related information 360 are included. This may include the sender's certificate when protocols such as S/MIME are used, for example. As a further example, if the signature is a PGP signature, the PGP signature will contain a PGP key identifier, which can be used to identify the PGP key that signed the message. The PGP key would not typically be included with the message. In general, individuals intending to communicate securely with each other may exchange PGP keys with each other in advance of such communications. The PGP key also typically contains information associated with the key holder, such as an address (e.g. an e-mail address) associated with the key holder.

Signed messages need not be restricted to messages having a single digital signature 360 appended to the end of the message. For example, some protocols may permit multiple, individual portions of data in message body 354 to be signed, or permit message attachments 356 to be signed (or not) independent of whether data in the message body 354 is signed. Accordingly, the resultant message may comprise multiple digital signatures contained within the message, possibly embedded within the message body 354 itself.

The format for an encoded message as shown in FIG. 5 is provided by way of example only, and persons skilled in the art will understand that encoded messages may exist in other formats. Depending on the specific secure messaging standard or protocol employed, components of an encoded message may appear in a different order than shown in FIG. 5, and an encoded message may include fewer, additional, or different components, which may depend on whether message data of the encoded message is encrypted, signed or both.

As a further example, an encoded message may comprise multiple encrypted session key blocks. Some protocols may permit individual portions or blocks of data in message body 354 to be encrypted, while other portions or blocks are not necessarily encrypted. The encrypted portions may be one, all, some, or none of the blocks in message body 354. Furthermore, with respect to the message attachments 356, one, all, some, or none of the attachments 356 may be encrypted, independent of whether any data in the message body 354 is encrypted. In accordance with certain protocols, multiple encrypted session keys 358 may be provided for the various encrypted message parts.

Embodiments of the systems and methods described herein relate generally to the processing of messages (e.g. electronic mail messages), and to protocols that allow some message parts of a message to be encoded independent of whether other message parts of the message are encoded.

For example, some PGP-based protocols allow the message data in the body of a message to be signed and/or encrypted, even where an attachment to the message is not to be similarly signed and/or encrypted.

Accordingly, situations may arise where message data in the body of a message (e.g. 354 of FIG. 5) is signed, while an attachment (e.g. 356 of FIG. 5) contained in the message is not signed. Similarly, message data in the body of a message may be encrypted, while the attachment is not encrypted. Conversely, a secure encoding may be applied to an attachment of a message (e.g. the attachment is signed and/or encrypted), while a secure encoding is not applied to the message data in the body of the message. As a further example, message data in the body of a message may be encoded (e.g. signed and/or encrypted) using one key of one key holder, while the attachment may be encoded using a different key, of the same or a different key holder. Moreover, message data in the body of a message may be encoded (e.g. signed and/or encrypted) using one encoding technique, while the attachment may be encoded using a different encoding technique. Where there are multiple attachments contained in a message, different secure encodings may be applied to different attachments, and some attachments may not be encoded while others are. These situations are provided by way of example only, and it will be understood by persons skilled in the art that other situations are possible in which different parts of a message are subject to different encoding techniques.

Known messaging applications are typically adapted to generate an indicator, for display to a user through a user interface, that allows the user to quickly identify whether the message data in the body of a message is signed and/or encrypted.

Unfortunately, when a user is informed that a particular message is secured by signing and/or encryption, it may not be immediately clear from the user interface of known messaging applications what message parts are included in the security layer. Known indicators are typically displayed in such a way that may lead the user to believe that all of the content of the message is signed and/or encrypted even in cases where only message data in the message body is so signed and/or encrypted.

This situation can be particularly problematic when the message contains one or more attachments. As noted above, with respect to certain secure messaging protocols, the manner in which an attachment of a message is secured may be different from the manner in which message data in the message body of the message might be secured. It is also possible that one of the attachment and the message data in the message body might be secured, while the other is not secured at all. The state of known indicators may be based solely on whether content in the main body of the message is signed and/or encrypted, without any regard to whether the same security encoding has been applied to the attachment(s) of the message. In known systems, it may also be particularly difficult for a user to determine if different security encodings have been applied to different attachments, where a message contains multiple attachments.

Consider the example scenario where a user receives a signed PGP message, and where a malicious attachment that is not signed was appended to the message by a third party while the message was in transit. When the user opens the message, an indication is displayed to the user that "the message" is signed by the message sender. The user is satisfied that the message data in the message body originated from the message sender and has not been modified in transit. However, if it is not immediately clear that the attachment is also similarly protected, the user may be led to assume, in error, that the malicious attachment is safe and originated from the message sender. This can breed a false sense of security in the user.

Embodiments described herein are generally directed to a system and method for generating a security encoding indicator on a display of a computing device such as a mobile device, to indicate whether a security encoding has been applied to particular message content, such as an attachment to a message received at the mobile device.

In exemplary embodiments, the security encoding indicator is displayed in association with each attachment to a message, to show whether or not the attachment is signed and/or encrypted. When a message or portion thereof is being displayed to a user, an identifier for each attachment to the message (e.g. the filename of the attachment, a link to the attachment object) is typically displayed, and the security encoding indicator is associated with this attachment identifier. The security encoding indicator may also be displayed to the user in association with the attachment when the attachment is opened and/or read by the user (e.g. using an identifier for the attachment displayed in an information bar).

In one embodiment, if an attachment is signed, a security encoding indicator comprises a ribbon icon that is displayed with the identifier for the attachment.

In one embodiment, if an attachment is encrypted, a security encoding indicator comprises a locked padlock icon that is displayed with the identifier for the attachment.

In one embodiment, if an attachment is signed, and a signature verification is performed but the signature verification fails, a security encoding indicator comprises an "X" icon (e.g. a red X) that is displayed with the identifier for the attachment. In another embodiment, a security encoding indicator can be displayed to the user when the key used to sign the first attachment is associated with a trusted certificate.

In one embodiment, an attachment identifier (e.g. the filename) may be displayed in different colors, font sizes and/or font styles used as security encoding indicators, which indicate whether the corresponding attachment is signed and/or encrypted, and/or whether the key used to sign the attachment is associated with a trusted certificate.

For example, a green attachment filename may be used to indicate that the attachment is signed, that the digital signature has verified successfully, and that the key used to sign the attachment is associated with a trusted certificate. A red attachment filename may be used to indicate that the digital signature was not verified successfully or that the attachment is not associated with a trusted certificate. A yellow attachment filename may be used to indicate that further information is required to determine if the attachment is associated with a trusted certificate. When an attachment filename is shown in black, this may indicate that the attachment is not signed.

In one embodiment, a security encoding indicator comprises a bar that is displayed with the content of a message being displayed to a user (e.g. a vertical bar alongside the message content being displayed), indicating what parts of the message are signed and/or encrypted. Different colored bars and/or multiple bars may be displayed depending on whether there are message parts that are signed, encrypted, or both. For example, a vertical bar used to indicate that message data in the message body is signed can be extended so that a portion of the bar is displayed beside the attachment identifier (e.g. filename) if the corresponding attachment is signed in the same way (e.g. using the same key).

In one embodiment, the security encoding indicator displayed in association with an attachment also identifies the key holder of the key used to sign the attachment. In another embodiment, in the display of content of the message or a portion thereof, the user may also be provided with the ability to access a menu option such that when the menu option is selected, data from a certificate of the key holder, with which the key used to sign the attachment is associated, is displayed to the user.

It will be understood by persons skilled in the art that multiple security encoding indicators may be displayed to a user in association with any given attachment. For example, separate icons may be displayed indicating whether an attachment is signed or encrypted respectively, or whether the key used to sign an attachment is associated with a certificate that has been determined to be trusted. Alternatively, a single, composite security encoding indicator may be provided that indicates that a certain condition applies to a given attachment, such as for example, that an attachment is both signed and encrypted, or that an attachment is both encrypted and signed with a key associated with a certificate that has been determined to be trusted.

A security encoding indicator displayed in association with an attachment may be displayed to a user not only to indicate that a security encoding has been applied to the attachment, but also to indicate when a particular security encoding has not been applied to the attachment, in variant embodiments. For example, an icon may be displayed that indicates when an attachment is not signed, when an attachment is not encrypted, or when an attachment is neither signed nor encrypted.

To facilitate a better understanding of a number of features of the embodiments described herein, example messages are provided in FIGS. 6A to 6D, by way of illustration only. It will be understood that the general format and content of messages displayed in a user interface may differ between various implementations.

Figure 6A:
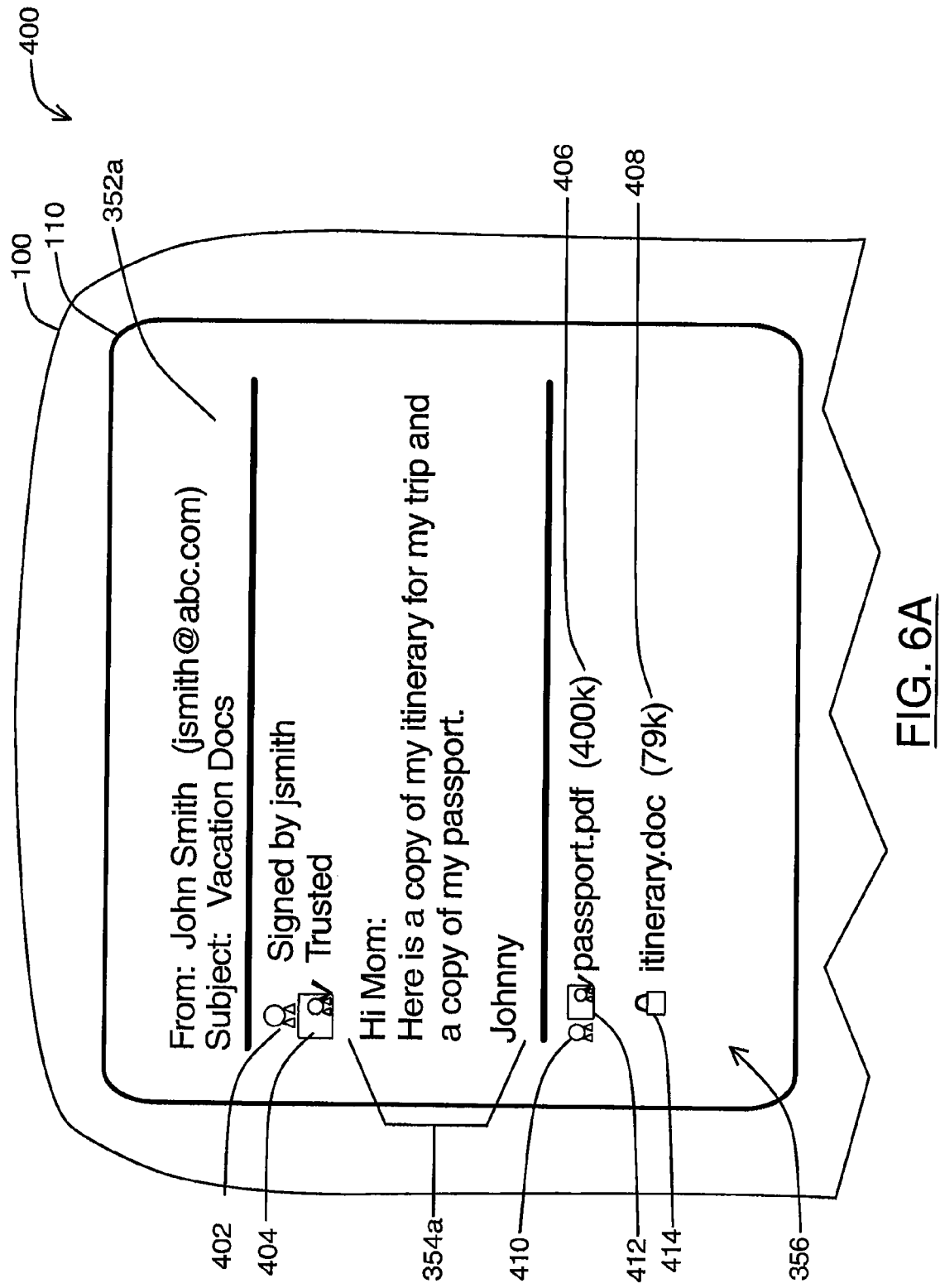

Referring first to FIG. 6A, an example of a message comprising encoded message content as displayed in a user interface in accordance with at least one embodiment is shown generally as 400.

In this example, a portion of a message from John Smith received by a user of a mobile device 100 is displayed in a display 110 of mobile device 100. The portion of the message displayed includes some message header information 352*a*, and message data in the message body 354*a*. Icons 402 and 404 are also displayed to the user indicating that the message data in message body 354a is signed with a key associated with a trusted certificate. Attachment identifiers 406 and 408 are also displayed to the user as filenames with attachment size information, indicating that there are two attachments 356, passport.pdf and itinerary.doc identified by attachment identifiers 406 and 408 respectively, which accompany the message. In this example, attachment passport.pdf is signed with a key associated with a trusted certificate but is not encrypted, and attachment itinerary.doc is encrypted but not signed.

In accordance with one embodiment, a first security encoding indicator 410, which appears as a ribbon icon and resembles icon 402, is displayed beside attachment identifier 406 to indicate that the corresponding attachment passport-.pdf is signed. Similarly, in this embodiment, a second security encoding indicator 412, which resembles icon 404, is also displayed beside attachment identifier 406 to indicate that the corresponding attachment passport.pdf is signed using a key associated with a certificate that has been determined to be trusted.

Although not shown in FIG. 6A, in one embodiment, if attachment passport.pdf is signed, but the signature was not successfully verified, the ribbon icon 410 may be replaced with a red "X" icon.

Furthermore, in this example, a security encoding indicator 414, which appears in the present example as a locked padlock icon, is displayed beside attachment identifier 408 to indicate that the corresponding attachment itinerary.doc is encrypted. However, since this attachment is not signed, a ribbon icon resembling icon 402 is not displayed beside attachment identifier 408.

Figure 6B:
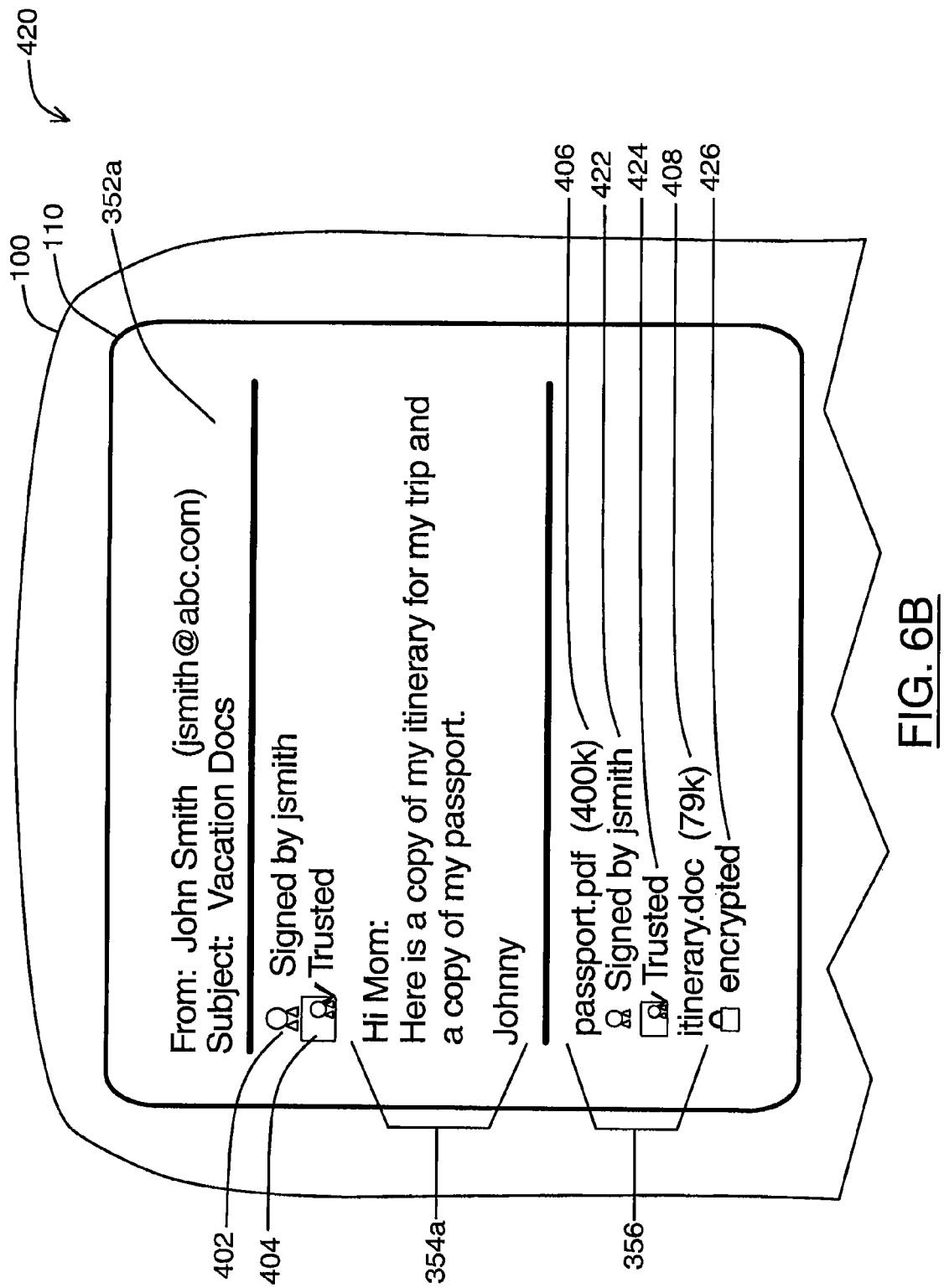

Referring now to FIG. 6B, an example of a message comprising encoded message content as displayed in a user interface in accordance with at least one embodiment is shown generally as 420.

The example shown in FIG. 6B is similar to the example shown in FIG. 6A, except that the security encoding indicators are displayed in a different manner. In accordance with one embodiment, a first security encoding indicator 422, which appears as a ribbon icon and resembles icon 402, is displayed in association with attachment identifier 406 (e.g. beneath the filename in this example) to indicate that the corresponding attachment passport.pdf is signed. The identity of the key holder whose key was used to sign the attachment is also identified and displayed to the user in this embodiment.

Provision of this functionality may enhance flexibility, as it is possible that different parts of a message may be signed by different key holders [although not shown in the example of FIG. 6B]. By identifying and displaying an indication of the identity of the key holder, the user can quickly identify which key holders had signed which message parts.

Although not explicitly shown in FIG. 6B, in operation, the user may also be provided access to a menu option that the user may select, that allows the user to view data from the certificate of the identified signer, in accordance with a variant embodiment.

In the example of FIG. 6B, a second security encoding indicator 424, which resembles icon 404, is also displayed beneath attachment identifier 406 to indicate that the corresponding attachment passport.pdf is signed using a key associated with a certificate that has been determined to be trusted.

Furthermore, in this example, a third security encoding indicator 426, which appears as a locked padlock icon, is displayed beneath attachment identifier 408 to indicate that the corresponding attachment itinerary.doc is encrypted. However, since this attachment is not signed, a ribbon icon (as in 422) resembling icon 402 is not displayed beneath attachment identifier 408.

Figure 6C:
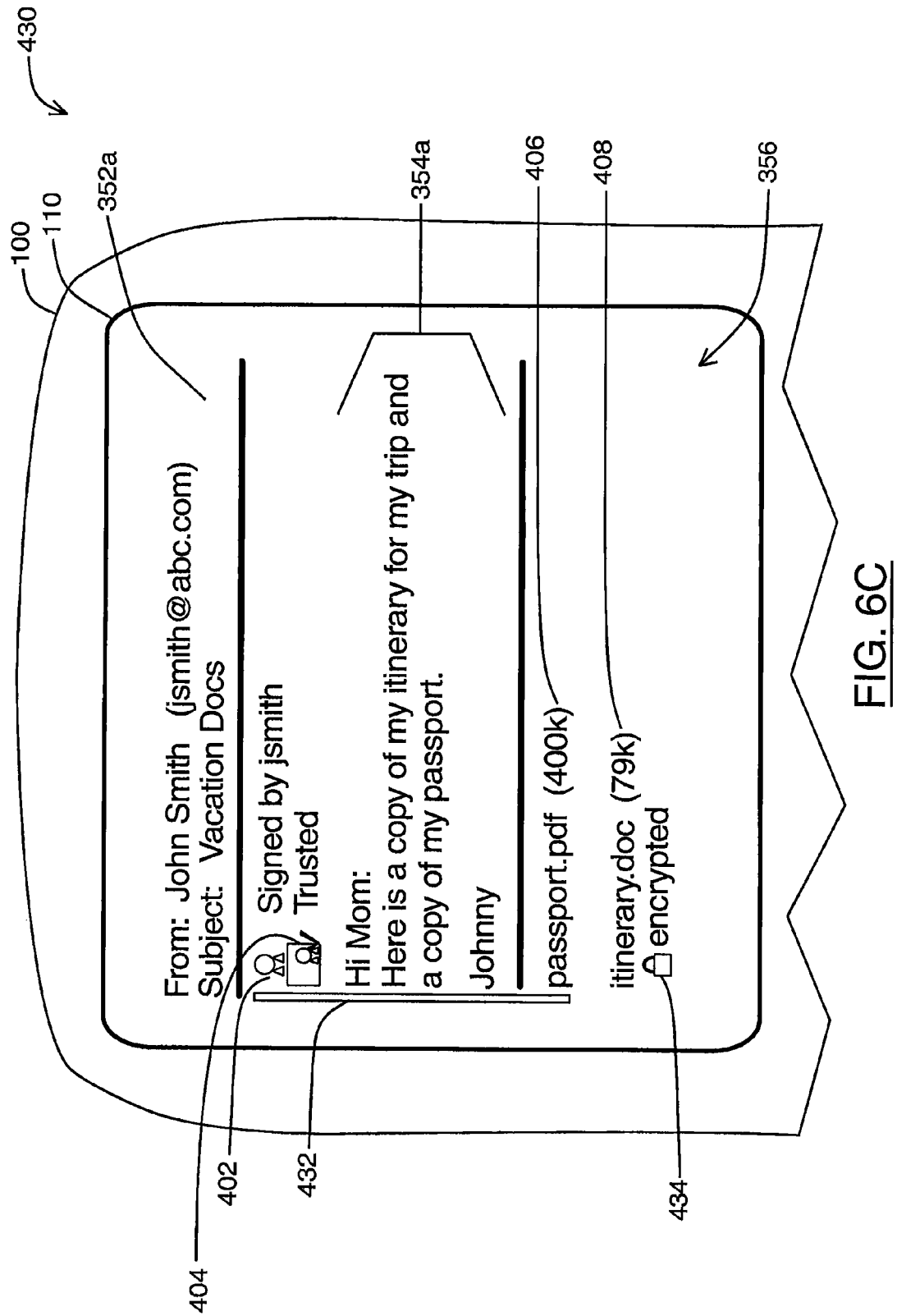

Referring now to FIG. 6C, an example of a message comprising encoded message content as displayed in a user interface in accordance with at least one embodiment is shown generally as 430.

The example shown in FIG. 6C is similar to the previous examples, except that the security encoding indicators are displayed in a different manner. In accordance with one embodiment, a security encoding indicator 432, which appears as a bar alongside the displayed portion of the message that extends to a position beside attachment identifier 406, is displayed to indicate to the user that the corresponding attachment passport.pdf is also included in the message data identified by icons 402 and 404 as being signed using a key associated with a trusted certificate. Bar 432 does not extend to a position beside attachment identifier 408 because attachment itinerary.doc is not so signed.

In this example, a security encoding indicator 434, which appears as a locked padlock icon, is displayed beneath attachment identifier 408 to indicate that the corresponding attachment itinerary.doc is encrypted.

In a variant embodiment, a separate bar (e.g. of a different color) may be displayed alongside bar 432 to identify which message parts are encrypted.

In another variant embodiment, the bar may be extended to form a border or outline around the displayed portion of the message, including attachment identifier 406, to indicate to the user that the corresponding attachment passport.pdf is also included in the message data identified by icons 402 and 404 as being signed using a key associated with a trusted certificate. The border or outline does not include attachment identifier 408 because attachment itinerary.doc is not so signed.

Referring now to FIG. 6D, an example of a message comprising encoded message content as displayed in a user interface in accordance with at least one embodiment is shown generally as 440.

The example shown in FIG. 6D is similar to the previous examples, except that the security encoding indicators are displayed in a different manner. In accordance with one embodiment, a security encoding indicator 442 is applied to attachment identifier 406 such that the attachment identifier 406 is displayed in a color, such as green, to indicate to the user that the corresponding attachment passport.pdf is signed using a key associated with a trusted certificate. In accordance with one example scheme, different colors may be used to indicate different secure states applicable to the corresponding attachment.

For example, if attachment passport.pdf is signed, but the signature could not be successfully verified, the filename may be displayed in another color, such as red instead of in green.

In this example, a security encoding indicator 444, which appears as a locked padlock icon, is displayed beneath attachment identifier 408 to indicate that the corresponding attachment itinerary.doc is encrypted.

In this example, attachment identifier 408 is shown in black, although in a variant embodiment, attachment identifier 408 may be displayed in a color that indicates to the user that the corresponding attachment is encrypted but not signed.

The foregoing examples are provided to assist in the illustration of a number of features described herein, and other variant implementations within the scope of the appended claims are possible.

Figure 7:
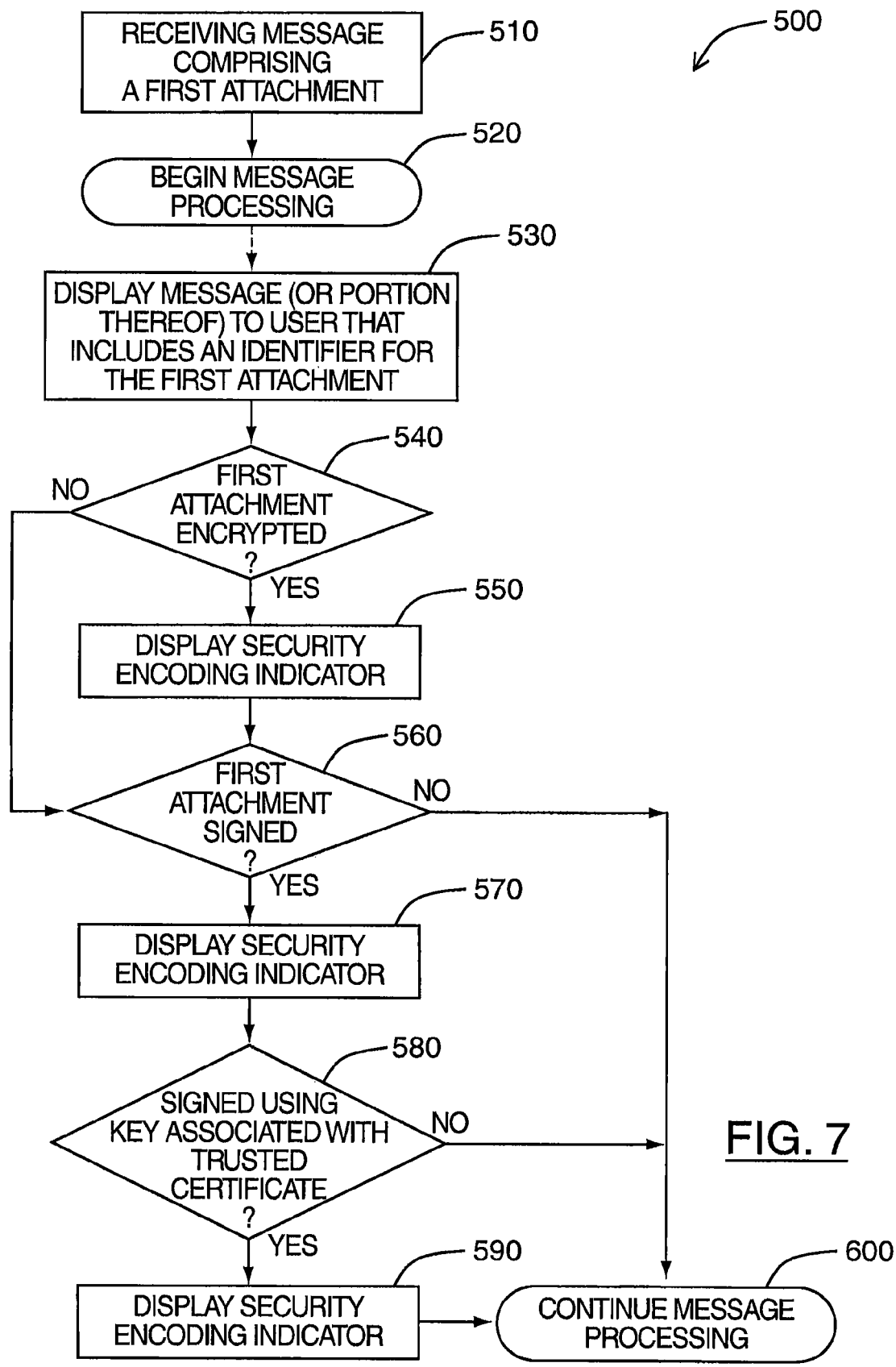
FIG. 7 is a flowchart illustrating steps in a method of generating a security encoding indicator in accordance with at least one embodiment.

Referring to FIG. 7, a flowchart illustrating steps in a method of generating a security encoding indicator in accordance with at least one embodiment is shown generally as 500.

Further details with respect to various steps of method 500 and with respect to features that may be employed in a number of embodiments described below have been provided earlier in this description.

At least some of the processing steps of method 500 may be performed by a messaging application executing and residing on a computing device (e.g. a mobile device).

Although the steps of method 500 are described with respect to a message comprising a single attachment for ease of exposition, it will be understood that the features described herein may be applied to messages comprising multiple attachments, wherein one or more security encoding indicators can be displayed to a user for each attachment to indicate what security encoding, if any, has been applied to the respective attachment.

At step 510, a message comprising at least a first attachment is received at the computing device.

At step 520, processing of the message received at step 510 by the messaging application begins. In general, the messaging application permits users to view and manage received messages. When users select a message for viewing in known manner, depending on the size of the message and the size of the display in which messages may be read, only a portion of the message content may be displayed to a user at any one time. Known messaging applications typically provide a user interface that allow users to scroll through or otherwise view different portions of lengthier messages.

When message data of the message (or a portion thereof is displayed, an identifier for the first attachment is also displayed at step 530. This identifier may be a filename of the first attachment, for example. Alternatively, or in addition to the filename, the identifier may comprise such information as the size of the first attachment, an attachment icon (e.g. a paperclip), or other data associated with the first attachment, for example.

At step 540, a determination of whether the first attachment is encrypted is made. If it is determined that the first attachment is encrypted, an appropriate security encoding indicator is displayed in association with the first attachment to the user, as shown at step 550. The security encoding indicator displayed at step 550 may be, for example, a locked padlock icon (e.g. positioned beside the identifier for the first attachment), a bar (e.g. extended to a position beside the identifier for the first attachment), or a particular color, font style, and/or font size applied to the identifier for the first attachment that indicates to the user that the first attachment is encrypted.

If at step 540, it is determined that the first attachment is not encrypted, then the flow of method steps proceeds to step 560 where processing of the message continues. In a variant embodiment, a security encoding indicator (e.g. an unlocked padlock icon, or a particular color, font style, and/or font size applied to the identifier for the first attachment) that indicates to the user that the first attachment is not encrypted is displayed [step not shown].

At step 560, a determination of whether the first attachment is signed is made. If it is determined that the first attachment is signed, an appropriate security encoding indicator is displayed in association with the first attachment to the user, as shown at step 570. The security encoding indicator displayed at step 570 may be, for example, a ribbon icon (e.g. positioned beside the identifier for the first attachment), a bar (e.g. extended to a position beside the identifier for the first attachment), or a particular color, font style, and/or font size applied to the identifier for the first attachment that indicates to the user that the first attachment is signed.

In one embodiment, data identifying the key holder of the key used to sign the first attachment may be displayed along with an icon (e.g. a ribbon) when the security encoding indicator is displayed.

In another embodiment, the user may be provided with a menu option such that when the menu option is selected, data from the certificate, with which the key used to apply the security encoding to the first attachment is associated, is displayed to the user [step not shown].

In one embodiment, step 560 also comprises verifying the digital signature of the signed attachment. Different security encoding indicators may be displayed at step 570 depending on whether the digital signature successfully verifies. For example, if the digital signature successfully verifies, a ribbon icon may be displayed in association with the first attachment, whereas if the digital signature does not successfully verify, an "X" icon (e.g. a red X) may be displayed in association with the first attachment and/or the identifier for the first attachment may be displayed in red.

If at step 560, it is determined that the first attachment is not signed, then the flow of method steps proceeds to step 600 where processing of the message continues. In a variant embodiment, a security encoding indicator (e.g. a crossed-out ribbon icon, or a particular color, font style, and/or font size applied to the identifier for the first attachment) that indicates to the user that the first attachment is not signed is displayed [step not shown].

At step 580, a determination of whether the first attachment was signed using a key associated with a trusted certificate is made. This is typically done by determining if the certificate, with which the key used to sign the first attachment is associated, chains to a trusted certificate. Depending on the secure messaging protocol used, a different mechanism to determine the level of trust in the authenticity of a certificate or similar construct may be employed. For example, the level of trust in the authenticity of a PGP key may be determined and verified at step 580.

If it is determined that the first attachment was signed using a key associated with a trusted certificate, an appropriate security encoding indicator is displayed in association with the first attachment to the user, as shown at step 590. The security encoding indicator displayed at step 590 may be, for example, a trusted certificate icon (e.g. positioned beside the identifier for the first attachment), a bar (e.g. extended to a position beside the identifier for the first attachment), or a particular color, font style, and/or font size applied to the identifier for the first attachment that indicates to the user that the first attachment is signed using a key associated with a trusted certificate.

In some embodiments, different security encoding indicators may be displayed that indicate different states with regard to the determination of whether the signed first attachment was signed using a key associated with a trusted certificate. For example, if further information is required to make the determination, the identifier for the first attachment may be displayed in yellow.

If at step 580, it is determined that the first attachment was signed using a key associated with a trusted certificate, then the flow of method steps proceeds to step 600 where processing of the message continues. In a variant embodiment, a security encoding indicator (e.g. a crossed-out certificate icon, or a particular color, font style, and/or font size applied to the identifier for the first attachment) that indicates to the user that the first attachment was not signed using a key associated with a trusted certificate is displayed [step not shown].

In the example shown in FIG. 7, security encoding indicators are displayed to the user at steps 550, 570, and 590, to indicate to the user that the first attachment is encrypted, signed, and signed using a key associated with a trusted certificate, respectively. As previously noted, in variant embodiments, a composite security encoding indicator may be displayed to the user. For example, a single security encoding indicator may indicate to the user that the first attachment is both signed and encrypted. Accordingly, a separate security encoding indicator may not necessarily be generated for display at each of steps 550, 570, and 590 even if it is determined that the conditions evaluated at steps 540, 560, and 580 respectively are satisfied, and therefore, one or more of steps 550, 570, and 590 may be omitted in the performance of method 500 in variant embodiments.

Exemplary embodiments have been described herein primarily with respect to messages comprising one or more attachments, and wherein security encoding indicators can be displayed to the user for any given attachment to indicate what security encoding has been applied to the attachment. More generally, in variant embodiments, at least some of the features described herein may also be implemented in respect of messages comprising multiple message parts within a message body that can be individually and independently encrypted and/or signed, as may be the case with certain PGP protocols, for example. In those variant embodiments, a security encoding indicator can be displayed to the user for any given message part to indicate what security encoding, if any, has been applied to that message part. For example, a message may comprise any of the following message parts: one or more encrypted blocks of data in the message body, one or more unencrypted blocks of data in the message body, one or more encrypted attachments, one or more unencrypted attachments, and any combinations of the aforementioned message parts. In such scenarios, the security encoding indicators may be displayed to indicate which message part or parts are encrypted.

The steps of the methods described herein may be provided as executable software instructions stored on computer-readable media, which may include transmission-type media.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The invention has been described with regard to a number of embodiments. However, it will be understood by persons skilled in the art that other variants and modifications may be made without departing from the scope of the invention as defined in the claims appended hereto.

The invention claimed is:

1. A method of displaying a message on a computing device, the message received by the computing device from a message server, wherein the message comprises at least a message body and a first attachment separate from the message body, the method comprising, after the message is received:
displaying at least a portion of the message body and, separate from the message body, an identifier for the first attachment in lieu of content for the first attachment, wherein the first attachment is encodable independent of whether data in the message body is encoded;
determining if at least one message body security encoding applies to the message body;
determining if at least one attachment security encoding applies to the first attachment;
a processor of the computing device generating at least one security encoding indicator in response to determining that the at least one message body security encoding applies to the message body or the at least one attachment security encoding applies to the first attachment; and
displaying the at least one security encoding indicator on a display of the computing device;
wherein if the at least one message body security encoding applies to the message body, the at least one security encoding indicator comprises a message body encoding indicator that is visually associated with the message body;
wherein if the at least one attachment security encoding applies to the first attachment, the at least one security encoding indicator comprises a first attachment security encoding indicator that is visually associated with the identifier for the first attachment; and
wherein the message body encoding indicator is visually distinguishable from the first attachment security encoding indicator.

2. The method of claim 1, wherein the computing device is a mobile device.

3. The method of claim 1, wherein the first attachment security encoding indicator indicates that one of the conditions selected from the following group applies to the first attachment: the first attachment is both signed and encrypted; the first attachment is signed but not encrypted; the first attachment is encrypted but not signed; and the first attachment is neither signed nor encrypted.

4. The method of claim 1, wherein the first attachment security encoding indicator indicates whether the first attachment is signed.

5. The method of claim 4, wherein the first attachment security encoding indicator comprises an icon that indicates that the first attachment is signed.

6. The method of claim 4, wherein the first attachment security encoding indicator further identifies a key holder of a key used to sign the first attachment.

7. The method of claim 4, further comprising providing a menu option such that when the menu option is selected, data from a certificate, with which a key used to sign the first attachment is associated, is displayed.

8. The method of claim 4, wherein the first attachment security encoding indicator further indicates whether a key used to sign the first attachment is associated with a trusted certificate.

9. The method of claim 4, wherein the first attachment security encoding indicator comprises an icon that indicates that a digital signature associated with the first attachment failed to verify successfully.

10. The method of claim 1, wherein the first attachment security encoding indicator indicates that the first attachment is encrypted.

11. The method of claim 10, wherein the first attachment security encoding indicator further identifies a key holder of a key used to encrypt the first attachment.

12. The method of claim 10, wherein the first attachment security encoding indicator comprises an icon that indicates that the first attachment is encrypted.

13. The method of claim 1, wherein the first attachment security encoding indicator comprises a portion of a bar associated with the first attachment that indicates whether the first attachment is at least one of encrypted or signed.

14. The method of claim 1, wherein the first attachment security encoding indicator comprises a portion of a border associated with the first attachment that indicates whether the first attachment is at least one of encrypted or signed.

15. The method of claim 1, wherein the first attachment security encoding indicator comprises at least one of a plurality of colors applied to the identifier for the first attachment that indicates whether the first attachment is at least one of encrypted or signed.

16. The method of claim 1, wherein the first attachment security encoding indicator comprises at least one of a plurality of font sizes applied to the identifier for the first attachment that indicates whether the first attachment is at least one of encrypted or signed.

17. The method of claim 1, wherein the first attachment security encoding indicator comprises at least one of a plurality of font styles applied to the identifier for the first attachment that indicates whether the first attachment is at least one of encrypted or signed.

18. The method of claim 1, wherein the message comprises a plurality of attachments.

19. The method of claim 18, wherein the method comprises displaying an identifier for each of the plurality of attachments, and wherein the act of displaying the at least one security encoding indicator comprises displaying at least one attachment security encoding indicator for each of the plurality of attachments, the respective at least one attachment security encoding indicator being associated with the identifier for the corresponding attachment; and wherein for each of the plurality of attachments, if at least one security encoding has been applied thereto, the respective at least one attachment security encoding indicator indicates the at least one security encoding applied to the corresponding attachment.

20. The method of claim 1, wherein the message comprises an e-mail message.

21. A non-transitory computer-readable medium upon which a plurality of instructions is stored, the instructions for performing a method of displaying a message on a computing device, the message received by the computing device from a message server, wherein the message comprises at least a message body and a first attachment separate from the message body, wherein the method comprises, after the message is received:
    displaying at least a portion of the message body and, separate from the message body, an identifier for the first attachment in lieu of content for the first attachment, wherein the first attachment is encodable independent of whether data in the message body is encoded;
    determining if at least one message body security encoding applies to the message body;
    determining if at least one attachment security encoding applies to the first attachment;
    a processor of the computing device generating at least one security encoding indicator in response to determining that the at least one message body security encoding applies to the message body or the at least one attachment security encoding applies to the first attachment; and
    displaying the at least one security encoding indicator on a display of the computing device;
    wherein if the at least one message body security encoding applies to the message body, the at least one security encoding indicator comprises a message body encoding indicator that is visually associated with the message body;
    wherein if the at least one attachment security encoding applies to the first attachment, the at least one security encoding indicator comprises a first attachment security encoding indicator that is visually associated with the identifier for the first attachment; and
    wherein the message body encoding indicator is visually distinguishable from the first attachment security encoding indicator.

22. A mobile device comprising:
    a processor;
    a memory; and
    a display;
    wherein in operation, the processor is configured to perform a method of displaying a message on a computing device, the message received by the computing device from a message server, wherein the message comprises at least a message body and a first attachment separate from the message body, wherein the method comprises, after the message is received:
        displaying at least a portion of the message body and, separate from the message body, an identifier for the first attachment in lieu of content for the first attachment, wherein the first attachment is encodable independent of whether data in the message body is encoded;
        determining if at least one message body security encoding applies to the message body;
        determining if at least one attachment security encoding applies to the first attachment;
        generating at least one security encoding indicator in response to determining that the at least one message body security encoding applies to the message body or the at least one attachment security encoding applies to the first attachment; and
        displaying the at least one security encoding indicator on a display of the computing device;
        wherein if the at least one message body security encoding applies to the message body, the at least one security encoding indicator comprises a message body encoding indicator that is visually associated with the message body;
        wherein if the at least one attachment security encoding applies to the first attachment, the at least one security encoding indicator comprises a first attachment security encoding indicator that is visually associated with the identifier for the first attachment; and
        wherein the message body encoding indicator is visually distinguishable from the first attachment security encoding indicator.

23. The non-transitory computer-readable medium of claim 21, wherein the first attachment security encoding indicator indicates that one of the conditions selected from the following group applies to the first attachment: the first attachment is both signed and encrypted; the first attachment is signed but not encrypted; the first attachment is encrypted but not signed; and the first attachment is neither signed nor encrypted.

24. The non-transitory computer-readable medium of claim 21, wherein the message comprises a plurality of attachments.

25. The non-transitory computer-readable medium of claim 24, wherein the method comprises displaying an identifier for each of the plurality of attachments, and wherein the act of displaying the at least one security encoding indicator comprises displaying at least one attachment security encoding indicator for each of the plurality of attachments, the respective at least one attachment security encoding indicator being associated with the identifier for the corresponding attachment; and wherein for each of the plurality of attachments, if at least one security encoding has been applied thereto, the respective at least one attachment security encoding indicator indicates the at least one security encoding applied to the corresponding attachment.

26. The mobile device of claim 22, wherein the first attachment security encoding indicator indicates that one of the conditions selected from the following group applies to the first attachment: the first attachment is both signed and encrypted; the first attachment is signed but not encrypted; the first attachment is encrypted but not signed; and the first attachment is neither signed nor encrypted.

27. The mobile device of claim 22, wherein the message comprises a plurality of attachments.

28. The mobile device of claim 27, wherein the method comprises displaying an identifier for each of the plurality of attachments, and wherein the act of displaying the at least one security encoding indicator comprises displaying at least one attachment security encoding indicator for each of the plurality of attachments, the respective at least one attachment security encoding indicator being associated with the identifier for the corresponding attachment; and wherein for each of the plurality of attachments, if at least one security encoding has been applied thereto, the respective at least one attachment security encoding indicator indicates the at least one security encoding applied to the corresponding attachment.

* * * * *